Feb. 12, 1963 T. J. SHANLEY 3,077,222
APPARATUS FOR PRODUCING CORRUGATED BOARD
Filed Sept. 23, 1959 5 Sheets-Sheet 2

INVENTOR
THOMAS J. SHANLEY

BY *Warburton & Cross*

ATTORNEYS

Feb. 12, 1963 T. J. SHANLEY 3,077,222
APPARATUS FOR PRODUCING CORRUGATED BOARD
Filed Sept. 23, 1959 5 Sheets-Sheet 3

INVENTOR
THOMAS J. SHANLEY
BY Warburton & Cross
ATTORNEYS

Feb. 12, 1963 T. J. SHANLEY 3,077,222
APPARATUS FOR PRODUCING CORRUGATED BOARD
Filed Sept. 23, 1959 5 Sheets-Sheet 4

INVENTOR
THOMAS J. SHANLEY

BY *Warburton & Cross*

ATTORNEYS

Feb. 12, 1963    T. J. SHANLEY    3,077,222
APPARATUS FOR PRODUCING CORRUGATED BOARD
Filed Sept. 23, 1959    5 Sheets-Sheet 5

INVENTOR
THOMAS J. SHANLEY

BY Warburton & Cross
ATTORNEYS 3,077,222
APPARATUS FOR PRODUCING
CORRUGATED BOARD
Thomas J. Shanley, Pittsburgh, Pa., assignor of fifty percent to Diamond Alkali Company, Cleveland, Ohio, a corporation of Delaware
Filed Sept. 23, 1959, Ser. No. 841,765
4 Claims. (Cl. 156—473)

This invention relates to improvements in the manufacture of corrugated board, and more particularly relates to a new and improved method and apparatus for producing corrugated board having improved stiffness and strength.

The term "corrugated board" is used throughout the specification and claims to refer to adhesively-bonded corrugated material comprising at least one planar cellulosic liner bonded to a corrugated cellulosic element via the tips of the flutes of the corrugated element. The manufacting operations involved in forming such a board comprise forming a corrugated element by passing a cellulosic sheet between meshing corrugating rolls and while the sheet is still engaged in the rolls, applying an adhesive to the tips of the thus-formed flutes. Thereafter, a planar cellulosic liner is applied against the adhesive-coated flutes of the corrugated element as the corrugated sheet passes between the corrugating roll and a smooth-surfaced pressure roll. The resulting adhesively-bonded "single-faced" board may then be used as such in certain applications. In many instances a second planar liner is applied to the exposed corrugated side of the single-faced element in a so-called "double backing" operation wherein adhesive is applied to the still exposed tips of the flutes and the second liner sheet is pressed thereagainst. The thus-formed double-backed board is passed through a so-called "hot plate" dryer section where it is heated between a continuously moving belt and stationary hot plates or platen surfaces to dry and/or dehydrate the adhesive and strengthen the adhesive bond, the assembled structure being held in smooth contact with the hot plates by steel idling rolls riding on top of the continuously moving belt.

Referring more specifically to the various operations involved in forming corrugated board, the initial bonding of a corrugated element to a liner is generally termed "single facing" and comprises adhering a corrugated cellulosic element to a flat cellulosic liner thereby to form a 2-ply structure permitting free bending in one direction. Such a product is known as a "single-faced" board and is typically used as such in wrapping and cushioning. In the formation of the adhesive bond in a single-facing operation, only a very short time is available for cementing the corrugated element to the flat liner as the corrugated roll and the pressure roll momentarily press the sheets into position and simultaneously apply heat and pressure to the situs of the desired adhesive bond. Typical contact times in which the adhesive bond must be formed in a single-facing operation are of the order of about 1/50 to 1/100 of a second. In order to form a satisfactory adhesive bond in the short time available, it is generally the practice to apply as high a pressure as possible and to operate at a relatively high temperature, the latter typically varying between about 300° and 500° F., or more, usually between 340° and 400° F., e.g., 375° F. In practice, the cellulosic materials being glued frequently have a lineal speed in the range of about 100 to 500 ft. per minute so that it will be appreciated that only a small time is available for forming the desired adhesive bonds.

The other principal operation referred to hereinbefore in forming corrugated board is that of applying a planar liner to the exposed corrugated surface of a single-faced corrugated element. In this operation, which generally is termed "double-facing" and is accomplished in a so-called "double facer" or "double backer," a previously-formed, single-faced, corrugated structure comprising a flat cellulosic sheet superimposed on and bonded to a corrugated, cellulosic element is provided with the second liner sheet bonded to the exposed flutes of the single-faced corrugated element.

The double-facing or double-backing process can be repeated as desired to form a so-called "double-walled" board comprising two flat liners and two corrugated members bonded to a third flat liner therebetween, or a so-called "triple-wall" board comprising four flat liners and three corrugated elements sandwich-style therebetween having the same or different flute heights, e.g., so-called "A," "B" or "C" flutes therebetween.

In forming the double-faced board in the double-backer, the problems encountered with respect to adhesive bonding are somewhat different from those involved in single-facing operations in that a longer time is available for forming the adhesive bond, typically from about 5 to 20 seconds. Also, somewhat lower machine temperatures are encountered, typical hot plate temperatures in a double-backer being about 300° to 350° F.

The strength and stiffness of the resulting single-faced or double-backed board is dependent to a large extent upon the strength and stiffness of the corrugated element. Accordingly, prior efforts to stiffen or increase the strength of corrugated board have included proposals to increase the thickness of the material from which the corrugated element is formed or to employ several layers of cellulosic liner in combination. Another approach has been to impregnate or coat the corrugated element with a sodium silicate solution. The former proposal of a thicker or multiply corrugated element while perhaps satisfactory in some instances, at times, involves additional laminating and bonding steps and for some applications provides a product which is too costly and too heavy or otherwise unsuitable.

Prior work with silicate coating of the corrugated elements as, for example, disclosed in U.S. Patent No. 1,199,508, Swift has not proved to be the answer to providing a high strength corrugated board adapted to be produced on modern high speed corrugated board-forming equipment in that pluggage and other spraying difficulties previously have been encountered and disadvantageous adhesive coating of the equipment has resulted. For example, difficulties in the manufacture of corrugated board have arisen when sprayed aqueous adhesive silicate compositions come in contact with the corrugating, pressure and idling rolls, platens of the hot plate dryers and other apparatus, undesirably forming glasslike, hard deposits thereon, thus fouling the rolls and hot plate sections and necessitating an interruption in production to remove the deposits. Further, as the laminated cellulosic structure passes between the belts and the platens of the hot plate section, some of the adhesive silicate composition frequently exudes from the portions of the laminate nearest the edges thereof, and is deposited upon the heated metal surfaces of the platens. After a relatively short time, these deposits of exuded silicate adhesive accumulate on the surface of the platens and other heated metal surfaces and build up into ridges or mounds near the edges of the moving laminated web and under the influence of the relatively intense heat are dehydrated to a hard, strongly adherent, solid silicate. Such hard deposits are then in a position to destroy the edges of the moving laminated structure passing across the heated surfaces.

Moreover, as the production of corrugated board of lesser and greater widths may be scheduled alternately on the equipment during a given production period, the changeover from the lesser to the greater width may leave hard, adherent silicate deposits of the hydrated adhesive in position to mar substantial areas of the wider corrugated board formed on such equipment. When the accumulation of the deposits of dehydrated silicate is sufficient to cause a destruction of substantial areas of the wider, laminated web passing thereover, the entire operation must be interrupted and the heated metal surfaces cleaned before the further production of such wider widths may be undertaken. A major difficulty in the cleaning operation arises in the fact that the dehydrated silicate adheres quite strongly to the heated metal surfaces, requiring considerable time and hand labor to dislodge the deposit and refinish the surface. Hence, despite the many advantages of silicate adhesives, including, of course, a high degree of adhesion to cellulosic materials, one of the problems heretofore limiting their application as adhesives and as stiffening agents has been this undesirable adhesion to heated metal surfaces.

Accordingly, the principal object of this invention is to provide an improved strong, stiff, corrugated board comprising a chemically-treated corrugated element while avoiding the difficulties heretofore encountered with the undesired adhesion of silicate adhesives to heated metal surfaces of the board-manufacturing apparatus.

Another object of the invention is to provide a novel method and apparatus for producing an improved corrugated board characterized by increased stiffness and strength.

These and other objects and advantages of the invention will more fully appear from the following description thereof.

The method of this invention comprises corrugating a wet, i.e., steamed, cellulosic liner usually heated to a temperature of up to about 375° F., and applying thereto prior to facing a stiffening agent, notably and preferably an aqueous alkali metal silicate solution having a silica:alkali metal oxide ratio of about 2.0 to 4.0:1.0, a solids content of about 30% to 45% by weight, and adhesively bonding to the thus-treated corrugated element a dry planar cellulosic liner using the applied stiffening agent as an adhesive; in certain instances, depending on the stiffening agent used and the application intended, an adhesive can also be applied to the tips of the flutes. If a double-backed board is desired, the thus-formed, single-faced board generally heated to a temperature up to about 375° F. is contacted on its exposed corrugated surface with a stiffening agent, preferably an aqueous alkali metal silicate of the previously-described type; there is then adhesively bonded to the thus-treated corrugated element a second planar liner and the resultant double-backed board is subjected to an elevated temperature of up to about 375° F. to reduce the moisture content of the finished board typically from about 25% to 10%.

The apparatus of the invention broadly comprises two cooperating, i.e., meshing, corrugating rolls adapted to corrugate a planar cellulosic sheet fed therebetween, and in combination therewith, a plurality of aligned spaced spray nozzles, disposed longitudinally subjacent one of said rolls and adapted to apply a substantially confined spray pattern across a corrugated sheet on one of said rolls, the width of the sheet to be covered by spray from said nozzles being defined by stationary end shields spaced longitudinally along said roll a predetermined distance, each shield embodying an upstanding anti-adhesive spray nozzle inclined toward the center of said roll.

In the practice of this invention, optimum results are obtained when the corrugator roll surfaces, as well as any other heated metal surfaces of the corrugated board-forming apparatus are treated either continuously or periodically during the application of the stiffening agent with a suitable anti-adhesive composition. It has been found that such a composition advantageously can be applied by spray nozzles disposed adjacent the areas to be treated. A feature of apparatus of this invention comprises longitudinally-adjustable end shields which are adapted to apply an anti-adhesive composition on predetermined areas of a corrugating roll surface, thereby to prevent adhesion of the applied stiffening agent to the heated metal surface.

When using an aqueous alkali metal silicate as a stiffening agent, a preferred anti-adhesive material is a petroleum oil-silicone composition as disclosed and claimed in pending application Serial No. 682,603, filed September 9, 1957, now Patent No. 3,027,291. It will be understood, of course, that other anti-adhesive compositions also can be used although, at present, optimum results are obtained with a petroleum oil-silicone composition.

Reference is now made to the accompanying drawings illustrating the invention.

Figure 1:
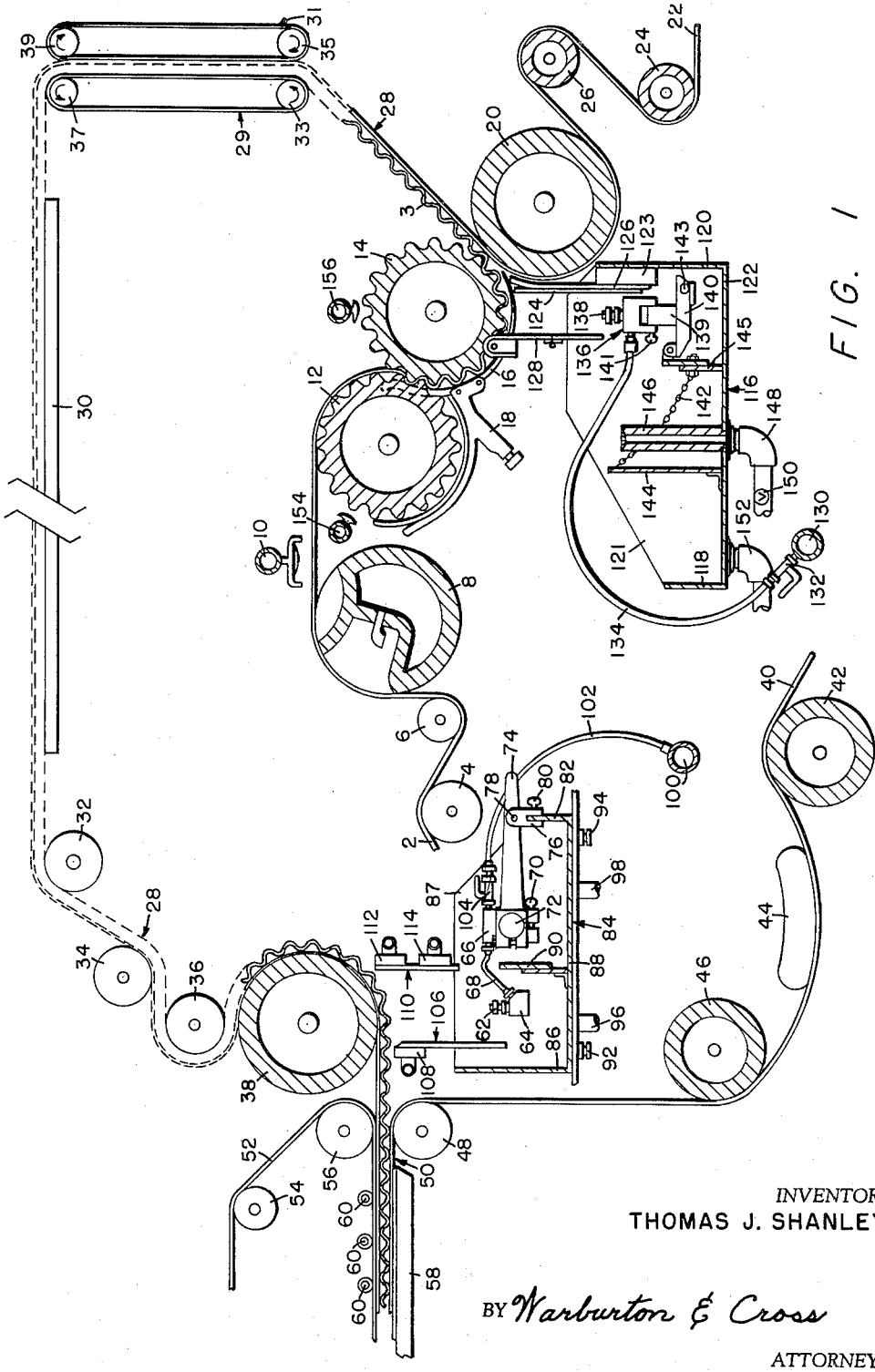
FIG. 1 is a diagrammatic sectional view, with parts broken away, of operative parts of apparatus comprising this invention.

In the drawings, FIG. 1 illustrates operative parts of apparatus of this invention, it being understood that the various corrugating rolls support and drive means which are not shown are conventional, for example, commercial corrugated board-forming apparatus such as the S & S Corrugated Paper Machinery Company, Inc. Right Hand Corrugating and Combining Machine illustrated in the "Corrugated Fibre Box Manufacturers Handbook," revised edition (1957) can be used in the practice of this invention.

Referring more particularly to the drawing, in FIG. 1, there is illustrated the manufacture of single-faced and double-backed corrugated board of this invention. As there shown, a cellulosic sheet or liner 2, by means of a feed roll 4 and idler roll 6, is fed over a pocket-type steam shower and spreader 8 whereon it is wetted on its underside via spraying with moist steam at temperatures up to 375° F. and then passed directly under an upper jet-type steam shower 10, whereby the upper surface of liner 2 is wetted and heated to a temperature up to 375° F. The thus-treated liner 2 then travels between an upper corrugating roll 12, and a lower corrugating roll 14, both corrugating rolls 12 and 14 being internally steam-heated to temperatures up to 375° F. and meshing so as to corrugate the steam-treated cellulosic liner 2 which is guided from the roll meshing by curved fingers 16 held in position by a finger holder 18, to pass directly under corrugating roll 14 at which point it is sprayed after corrugation but prior to facing with a stiffening agent, notably an aqueous alkali metal silicate, which, of course, is not only applied to the tips of the flutes of the corrugations but also to the entire underside of the corrugated element 3, thereby adding rigidity to the corrugations when dried.

After the stiffening agent is applied by spraying, the single-faced corrugated element 3 is then directed between corrugating roll 14 and a smooth surfaced pressure roll 20 between which it is brought into contact with a second cellulosic liner 22, that has been preheated by two steam-heated preheater rolls 24 and 26, to a temperature up to 375° F. As the corrugated and planar elements press between corrugating roll 14 and pressure roll 20, which is also a steam-heated roll at a temperature up to 375° F., employing the adhesive properties of the stiffening agent which is not yet dried in situ, a single-faced corrugated board 28 is formed. The single-faced board 28 is then carried in flight between endless conveyor belts 29 and 31 which are held in position by means (not shown) to travel around idler rolls 33 and 35 and driven rolls 37 and 39 which are driven by a means (not shown) thereby directing the single-faced corrugated board 28 to pass directly over a stationary flat heater 30 maintained at a temperature up to 375° F., and over a heater roll 32 maintained at a temperature of up to 375° F. The single-faced board 28 is then guided by idler rolls 34 and 36 around a steam-heated, double-backed smooth surfaced preheater roll 38 and thereby heated to temperatures up to 375° F. As the single-faced board 28 passes directly around and under roll 38, its exposed corrugated surface is sprayed with a stiffening agent, preferably an aqueous alkali metal silicate, which covers not only the tips of the flutes, but also the valleys of the corrugations as well. When the stiffening agent also has adhesive properties as is the case when an aqueous alkali metal silicate is used, an adhesive need not be provided to bond the single-faced board 28 and a preheated planar cellulosic sheet 40 hereinafter referred to as a double-back liner. Adhesive may be applied, if desired or necessary, to the tips of the flutes at this point, and/or, if desired, also in the single-facing operation, by a so-called glue roll applicator (not shown).

The double-back liner 40 is first conditioned by successively passing over, under and around preheater rolls 42, a stationary kidney-shaped preheater 44 and around idler roll preheater 46, each of which is internally heated to temperatures up to 375° F. Smooth surfaced roll 48 acts as a liner guide roll in bringing the double-back liner 40 into contact with the corrugated sprayed side of the single-faced board 28 wherein an adhesive bond is produced between the two elements 40 and 28, thereby forming a double-backed corrugated board 50. The thus-formed board 50 is moved over a stationary heated platen 58 by an endless belt 52 mounted and held in alignment by passing around idler rolls 54 and 56. The board 50 is kept in contact with heated platen 58, the temperature of which is maintained up to 375° F., for the purpose of drying the stiffening agent and/or adhesive, by weighted rolls 60, located immediately above the platen 58, which are adjusted so as to maintain the correct pressure on the corrugated board 50 so that it will be efficiently dried but not crushed.

Figure 3:
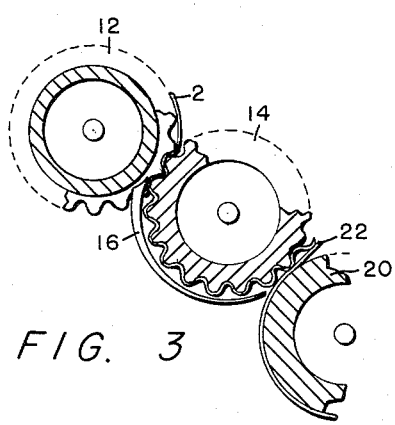
FIG. 3 is a fragmentary section at end view of rolls and guide fingers of this invention embodied in a single-facing machine.
Figure 4:
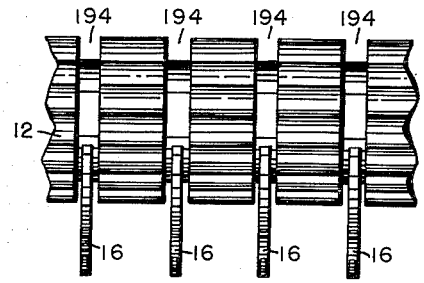
FIG. 4 is a fragmentary plan view of guide fingers and their relationship to the corrugating roll with certain proportions exaggerated for clarity.

FIG. 3 illustrates curved guide fingers 16 provided to guide the wet sheet from roll 12 and around corrugator roll 14 and properly be brought into contact with liner 22 as they make contact between pressure roll 20 and corrugator roll 14. FIG. 4 is a fragmentary view, with proportions exaggerated for clarity, of a portion of corrugator roll 12 and fingers 16 indicating their relationship to each other, roll 12 having grooves 194 to accommodate the topmost end of fingers 16 as they come in contact with sheet 2 in guiding its movement from corrugator roll 12 around and beneath corrugator 14.

The improvement of this invention as incorporated in the foregoing single-facing and/or double-backing operations comprises applying to the corrugated surface via spray apparatus, hereinafter described, a stiffening agent prior to the facing operation. As used in the specification and claims, the term "stiffening agent" is intended to refer to and to include various materials which can be applied to the corrugated surface during the manufacture of corrugated board after corrugation but prior to facing. A preferred stiffening agent is a material which also is an adhesive so that adhesive bonding of the corrugated element to an overlying cellulosic element can be effected without separate application of an adhesive to the tips of the corrugation flutes.

Suitable stiffening agents which also are satisfactory as adhesives are various organic adhesives and alkali metal silicate adhesives as conventionally used in the manufacture of corrugated board. Alkali metal silicates are the preferred stiffening agents of this invention employed in the form of aqueous solutions. While the expression "alkali metal silicate" is intended to refer to silicates of the various alkali metals, e.g., sodium, potassium, lithium, rubidium, and cesium, sodium silicates are generally more economical and more readily available; accordingly, aqueous sodium silicates constitute a preferred type stiffening agent.

Using an aqueous alkali metal silicate, it is preferred that the silica to alkali metal oxide weight ratio be within the range from about 2 to 4:1, inclusive. Superior results are obtained when the ratio is about 3.0 to 3.7:1.0. When such a silicate is employed, it desirably contains sufficient water to provide a solids content of 30% to 45% by weight. In practice, this at times involves slight dilution of a commercially available aqueous alkali metal silicate. An optimum dilution provides an aqueous silicate of 36° to 42° Bé. Illustrative specific silicates are the following commercially available sodium silicates:

| $SiO_2:Na_2O$ Ratio (Wgt. Ratio) | Percent Solids (Average) | Sp. Gravity (° Baumé) |
| --- | --- | --- |
| 3.3:1.0 | 37.3 | 40.0–41.2 |
| 3.22:1.0 | 37.5 | 40.0–41.5 |
| 3.22:1.0 | 38.8 | 41.5–42.5 |
| 2.84:1.0 | 42.2 | 46.0–48.0 |
| 2.0:1.0 | 43.5 | 49.0–51.0 |
| 2.4:1.0 | 46.6 | 51.0–53.0 |

As shown in the drawings, the spray apparatus of the invention comprises plurality of aligned spray nozzles both in the single-facing and the double-backing operations, which nozzles are adjustable and adapted for continuous spray operation without plugging or other malfunction as previously encountered in the application of stiffening agents. In combination with the adjustable nozzles, there are provided suitable open-topped containers subjacent the nozzles and adjustable side shields at each end to define the length and width of the spray zone to be surface-treated with the stiffening agent. While these portions of the apparatus of this invention are described in some detail hereinafter, it will be appreciated that means are provided whereby the nozzles can be retracted or otherwise adjusted individually or as a unit in a manner which does not interfere with the normal operation of the high speed corrugated board-forming machinery in which they are incorporated. In addition, means are provided accurately to define the area to be treated with the stiffening agent and also to prevent or minimize adhesion of the stiffening agent to heated metal surfaces of the corrugated board-forming apparatus.

In the single-facing operation, an open top container or pan 116 subjacent the corrugating rolls comprises ends 118 and 120, sides 121 (the front side being omitted for clarity) and a bottom 122, the pan preferably being mounted directly below the corrugating roll 14. The pan is used to contain a liquid, usually water, to permit submerging nozzles 138 therein when not in use, and to catch any excess stiffening agent from the spray operation. Mounted on the end 120 of pan 116 is a pressure roll shield adjustment block 123 supporting a back spray shield 124, and a curved pressure roll shield 126. A pivotally-supported hinged front spray shield 128 is more clearly shown in FIGS. 10 and 11. The stiffening agent is provided from a header 130 via feed control valves 132 and a flexible hose 134 connected to spray assembly designated by the numeral 136 and from there to spray nozzle 138 mounted thereon.

Figure 2:
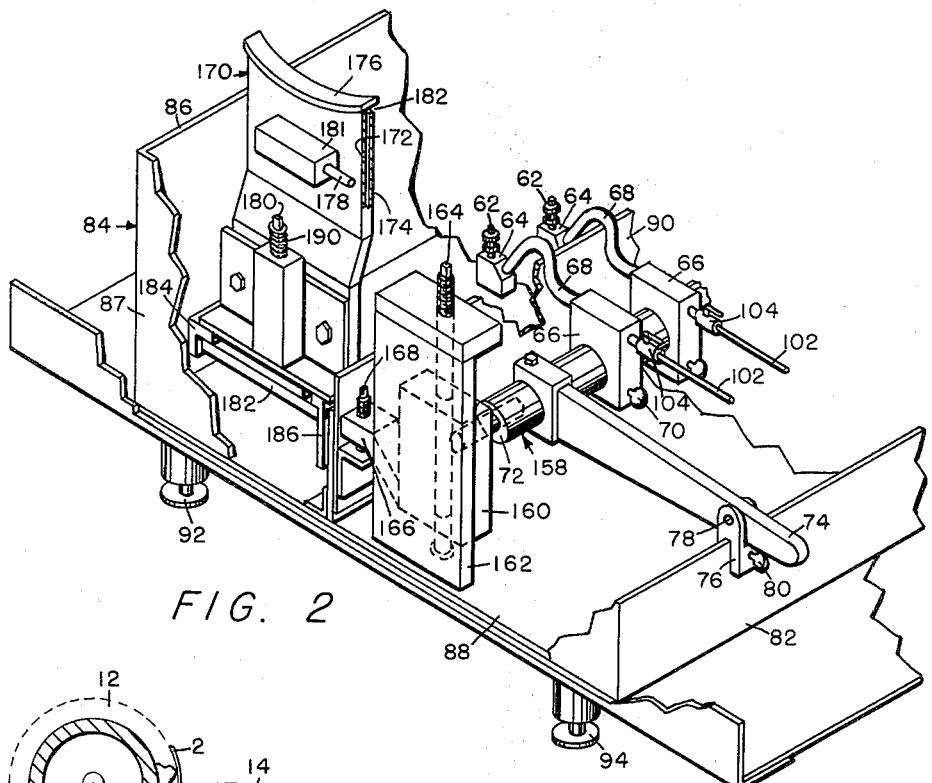
FIG. 2 is an isometric fragmentary section of a nozzle arrangement of this invention including an end shield and pan, embodied in a double-backing machine.

A horizontally-extending spray assembly support bar 139 is securely mounted on a pivotally-supported adjustable bracket 140. The bracket 140 is pivotally supported at one end by a transverse pivot 143 and at the opposite end by a freely-pivoted leg 145. A chain 142 is connected to the leg 145 whereby leg 145 can be pulled out from under bracket 140 thereby submerging the nozzle 138 into liquid in pan 116. The opposite end of the chain is secured to the topmost edge of an intertank partition 144. A removable overflow standleg 146 is provided completely to control the depth of liquid and to permit draining of the pan via a drain pipe 148 welded thereto. The drain pipe 148 is provided with valve 150 to control the draining operation. A drain 152 is provided from the left compartment of pan 116. An antiadhesive coating, typically a petroleum oil mist is applied with nozzles 154 and 156 to the surfaces of the corrugating rolls to prevent the adhesive from adhering to said rolls. Stiffening agent is applied to the single-faced board 28 prior to the bonding of the double-back liner 40 by spraying the stiffening agent, preferably an adhesive, through a plurality of aligned nozzles 62 (as shown in FIG. 2) each mounted in and extending from a nozzle block 64 connected to an adjustable mounting block 66 by a rigid curved feed tube 68. Each of the adjustable mounting blocks 66 can be moved pivotally and independently about a support bar 72 by a securing screw 70 which secures it to the mounting bar 72. The spray assembly comprising the nozzles 62, feed tubes 68 and mounting blocks 66 can readily be adjusted or moved as a unit by adjusting lever 74, which oscillates bar 72 and is pivotally secured to bracket 76 and 78 held in a desired position by means of a thumb screw 80, securing it to container or pan end 82.

The bar 72 of the spray assembly 158 is journalled at each end in a vertically-adjustable block 160 held in place by adjustment screw 164 extending downwardly through support member 162. The mounting block 160 comprises a laterally-extending lug 166 provided with a liquid level adjustment screw 168 mounted thereon to position vertically-adjustable liquid level baffle 90.

Pan 84, provided with leveling screws 92 and 94 and having ends 82 and 86, sides 87 (the front side being omitted for clarity) and bottom 88, is an open-top container to receive any excess stiffening agent that runs back from the sprayed corrugated surface of single-faced board 28; it is also used to contain a liquid, usually water, to a depth great enough to permit submerging the nozzles 62 therein when not in use, thereby eliminating nozzle plugging from drying of the stiffening agent on and in the nozzle when left in the atmosphere. The level of the liquid is maintained at a desired depth by an adjustable vertical baffle 90. Drain pipes 96 and 98, provided with control valves (not shown), carry out the excess adhesive and/or liquid not desired in the pan.

Figure 5:
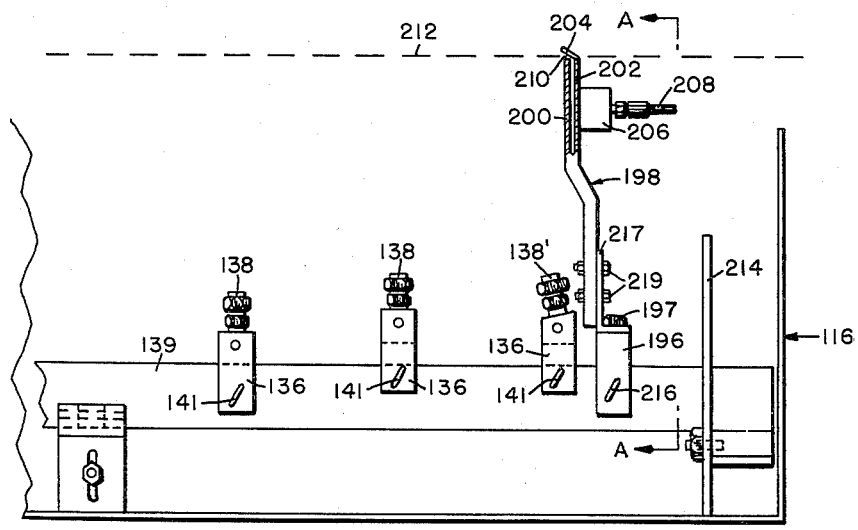
FIG. 5 is an elevational view with parts broken away of an end shield and nozzle adjustment means of this invention embodied in a single factor.

The stiffening agent is supplied to the nozzles 62 from a header 100 through a flexible hose 102 to the mounting block 66. The flow of stiffening agent to each nozzle is controlled by valve 104. Shields are provided on both front and back of the spray zone to prevent stiffening agent being sprayed on undesired areas. A back shield 106, provided with a water jacket 108, typically formed of any suitable material, coated with an antiadhesive such as Teflon, etc., extends the length of the roll 38. The front shield 110 similarly extends the length of roll 38 and is provided with two water jackets 112 and 114. Both shields and water jackets are more clearly shown in FIGS. 8 and 9. Each of the front and back shields is provided, via the water jackets, with means to provide a descending layer of water or other liquid down the inside face thereof. Also included in the apparatus shown in FIG. 2 is an end shield assembly indicated generally at 170 which is made up of a back 172 and a front 174 and curved top 176 adapted to fit the diameter of the roll which is to be protected, an anti-adhesive being supplied through line 178 to header 181, and thence into the hollow portion of said end shield and out to the roll through nozzle opening 182 as shown in FIGS. 2 or 5. Each of the two end shields 170 is so mounted on a horizontally-disposed track comprising parallel support angles 184 and 186 that it may be moved thereon to correspond to the width of the corrugated medium being used. Each end shield is held in place on the track by a clip assembly 182, threadedly engaged by a screw 180 and spring-loaded by a spring 190 on screw 180 which holds it in the desired position.

FIG. 5 illustrates the nozzle arrangement as employed in the single-facing operation shown in FIG. 1 and pan 116 in which is shown the spray assembly support bar 139 onto which is fastened a plurality of nozzle assemblies 136. The end nozzles, 138' at each end of assembly support bar 139 are inclined toward the center of the roll to be sprayed, typically at an angle of 12.5° from the vertical and are fitted with a 25° flat spray pattern head. The other nozzles 138 desirably are equipped with 95° flat spray pattern heads. Each adjustable nozzle assembly 136 is held in place on the horizontal support bar 139 and held thereon by thumb screws 141. A support bar adjusting lever 214 is provided for lifting the entire spray nozzle assembly back into operating condition after it has been submerged in the idle position by disengagement of leg 145.

At each end of the width to be sprayed is an end shield 198 mounted on an inverted U-shaped adjustable support block 196 provided with holding screw 216. The end shield 198 comprises a front 200, a back 202 and an inclined top 204 which is curved to fit the diameter of the roll under which it fits and protects the bottom of this roll being represented by the dotted line 212 in FIG. 5. In the preferred practice of this invention, an anti-adhesive composition is sprayed on the roll through opening 210 of the end shield 198. This composition is supplied via the header 206 and line 208 from a source (not shown).

Figures 6, 7:
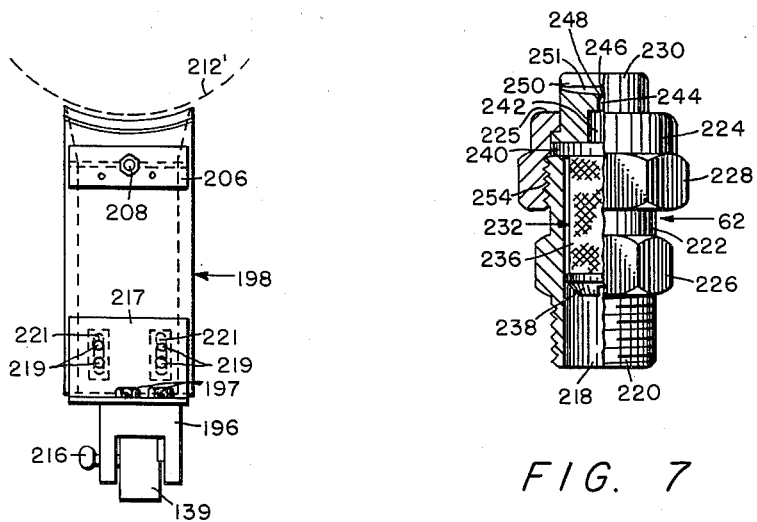
FIG. 6 is an elevational view of an end shield taken along line A—A of FIG. 5.
FIG. 7 is a view, partially in section, of a stiffening agent spray nozzle used in the practice of this invention.

FIG. 6 is a view of end shield 198 along line A—A of FIG. 5, wherein the line 212' represents the roll being protected. The end shields 198 are supported and adjusted vertically by means of upstanding brackets 217 secured to blocks 196 via bolts 197; vertical adjustment is effected by bolts 219 and nuts (not shown) movable in slots 221 in the lower portion of the shields 198.

FIG. 7 is a view, partially in section, of a stiffening agent spray nozzle used in the practice of this invention; the particular nozzle shown is described in U.S. Patent No. 2,621,078. The nozzle, designated generally at 62 in FIG. 7 but corresponding to nozzles 138, 138' and 62 of FIGS. 1 and 5, has a body 222 provided with external threads 220 at one end and having a cylindrical opening 218 therethrough. A screwed on collar or clamping device 224 is threaded at 254 on the opposite end of the body. The collar 224 has a rolled-in edge 225 to engage and secure a flat-sided nozzle tip 230 in alignment with an annular internal filter or strainer flange 240; an internal filter 232 is disposed longitudinally in opening 218 of the body 222. Collar 224 and body 222 each have a portion of their length comprising an externally hexagonal form as indicated at 226 and 228, respectively. The filter or strainer 232 has a cylindrical body 236 surrounded by a cylindrical screen which is held in place by screw 238. The flat-sided nozzle tip 230 has a bored-out cavity 242 in communication with the interior of the strainer body 236 and leading through a relatively small diameter bore or passage 244 terminating in a rounded or dome-shaped outer end 246 in which the spray orifice 248 is formed.

This orifice 248 is recessed in the end of the nozzle at the bottom of a channel or groove 250 which extends transversely across the nozzle end. At the bottom of the groove 250 is provided a V-groove 251 of suitable depth to form orifice 248 of the desired size and shape. A suitable commercially available nozzle of this type is the so-called "Flat Atomizing Nozzle," ¼ TT 95015, produced by Spraying Systems Co.

Figure 8:
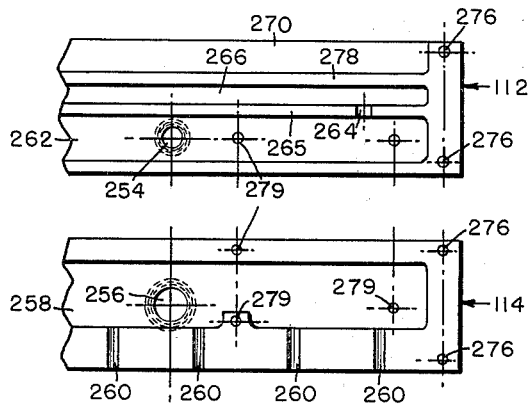
FIG. 8 is a view of the front spray shield with the front plate removed.
Figure 9:
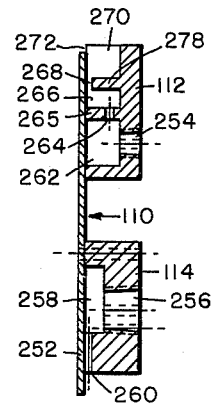
FIG. 9 is a sectional view of the spray shield shown in FIG. 8 taken along line B—B, with the front plate in place.

FIG. 8 is a fragmentary view of front shield 110 used with the double backing machine. In this view, the front or cover plate has been removed for clarity but is shown in FIG. 9 at 252. The front shield 110 is composed of the front plate 252 (not shown), an upper water jacket 112 and a lower water jacket 114. Bolts (not shown) through holes 276 afford a means of securing this assembly to the front shield assembly support bracket (not shown). Similarly, bolts (not shown) extending through holes 279 provide means for mounting the upper water jacket 112 and lower water jacket 114 on the front plate 252.

Water enters the lower water compartment 262 of the upper water jacket 112 through opening 254 from a source (not shown). The upper wall 265 of compartment 262 guides the water upwardly through openings 264 to the middle compartment 266. A baffle 278 controls the upward water flow into the top compartment 270 from where it overflows down the face of the front plate 252 to pan 84 shown in FIG. 1. The water enters the lower water jacket 114 through opening 256 into compartment 258 from where it flows downwardly through openings 260 which are formed by a plurality of grooves in the front edge of the bottom of compartment 258, thereby, with front plate 252, forming a series of openings through which the water flows. With the water flowing down the face of plate 252 from the upper compartment 270 of jacket 112 and from compartment 258 of lower jacket 114 to pan 84 below, as shown in FIG. 1, a double film or shield of water is provided to block the opening between the front plate 252 and pan 84, shown in FIG. 1, thereby forming a water surface spray shield preventing adhesive deposit on unintended areas of the equipment.

A back spray shield 106 assembly shown in FIG. 1 at 106 provided with a water jacket 108 is not shown in detail but is in design similar to front shield assembly 110. However, it differs in that it employs only one jacket comprising an upper water jacket 108 like jacket 112 of shield assembly 110 with the overflow outlet so the water flows down over the front of the shield and then in free fall to pan 84, shown in FIG. 1. As with the front assembly, the water then forms a film or shield protecting equipment from adhesive spray. The use of the front shield 110 and back shield 106 form, together with the end shields 170, an enclosed spray area.

Figure 10:
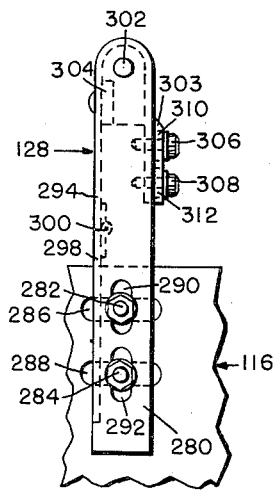
FIG. 10 is an end view of a front spray shield support for a single-facer.
Figure 11:
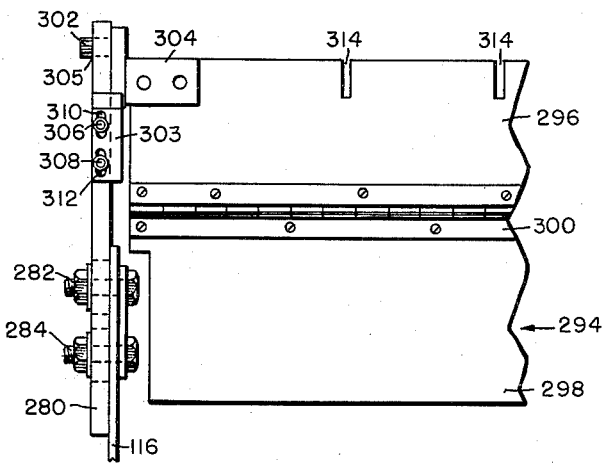
FIG. 11 is a fragmentary view of the front spray shield of FIG. 10 taken along line C—C.

FIGS. 10 and 11 illustrate in more detail the front spray shield assembly 128 used on the single-face machine. As there shown, the spray shield 128 is secured in position by upstanding end brackets 280 to the side walls of pan 116 by bolts 282 and 284. The position of the brackets is adjustable both vertically and horizontally by horizontal slots 286 and 288 in the walls of pan 116 and vertical slots 290 and 292 in the bracket 280. The shield 294 is composed of an upper plate 296, provided with slots 314 in its upper edge to accommodate fingers 16, and a lower plate 298. These plates are joined by a hinge 300. The shield 294 is pivoted on horizontally-disposed pin 302 secured at the top edge of the upper plate 296. Pin 302 pivots in hole 305 of end bracket 280. Shield 294 and pin 302 are joined and held together via a bracket 304. Bumper plate 303 is held in place by screws 306 and 308 in slots 310 and 312. FIG. 11 illustrates in a partial front view front shield assembly of FIG. 10 wherein 116 represents the side wall of a pan over which the shield assembly 128 is mounted by means of bolts 282 and 284.

The back shield 124 of FIG. 1 used in the single facing operation comprises a horizontally-disposed vertical metal sheet extending substantially the entire length of the rolls 14 and 20. Thus, it will be appreciated that shields 124 and 128, in cooperation with end shields 198, define a spray zone which prevents undesired coating of the equipment with the stiffening agent.

While two different embodiments of spray apparatus of this invention are illustrated in FIG. 1, i.e., one on the single facing and one on the double backing apparatus, it should be understood that these assemblies essentially are interchangeable.

FIGS. 12 through 26 illustrate various corrugated boards formed in accordance with this invention. In the following figures, the thicknesses of the layers of stiffening agent are exaggerated for clarity.

Figure 12:
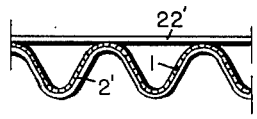
FIGS. 12 through 26 show, via cross-sectional representations, various combinations of corrugated boxboard elements embodying the invention.
Figure 13:
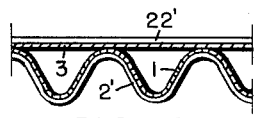
Figure 14:
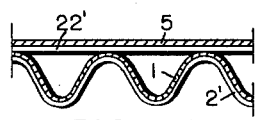

FIG. 12 represents a single-faced element wherein the corrugated web 2' is treated on one side with a stiffening agent, preferably sodium silicate, as shown at 1, it being used both as a stiffening agent and as an adhesive to bond the corrugated element to the liner 22. FIG. 13 illustrates a board construction wherein the corrugated web 2' is stiffened with the adhesive as at 1, but the overlying liner 22 is also coated on the inside with a stiffening agent as at 3. FIG. 14 in like manner shows a corrugated element 2' stiffened on one side as at 1, then being joined to a liner 22' which in turn has been reinforced or stiffened on its outermost side as at 5.

Figure 15:
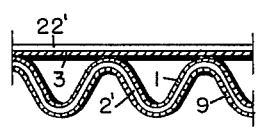
Figure 16:
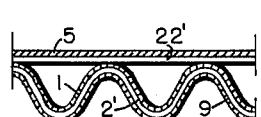
Figure 17:
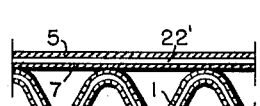

FIG. 15 shows a construction wherein the corrugated element 2' has been stiffened on the side adjoining the liner 22'. Element 22' has also been coated with adhesive as at 3; however, in this case, the corrugated element 2' has also been treated on its opposite side as at 9. In FIG. 16 the corrugated element 2' has been treated with stiffening agent on both sides as at 3 and 9; however, the liner 22' has been coated only on its outer side as at 5. In FIG. 17, as in the previous figures, the corrugated element 2' has been treated on both sides as at 3 and 9; also, the liner 22' has been treated on both sides, 5 and 7.

Figure 20:
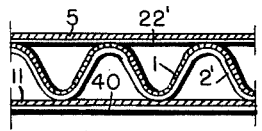
Figure 18:
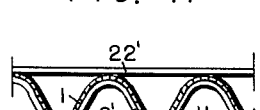
Figure 19:
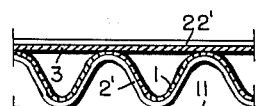

FIGS. 18 through 26, inclusive, illustrate double-backed corrugated board embodying the invention. In FIG. 18 the corrugated element 2' is treated with stiffening agent on one side as at 1, and bonded thereby to a liner 22'. On its opposite side it is bonded to a second liner 40' which has also treated with a stiffening agent 11. FIG. 19 shows a corrugated element treated on one side as at 1 bonded to a liner 22' also treated as at 3. The liner 40' for the opposite side has also been treated on its side 11 toward the corrugations. In FIG. 20, the corrugated element 2' is treated on one side as at 1 and bonded to a liner 22' which is coated on its outerside as at 5. Liner 40', bonded to the opposite side of corrugated element 2', is coated on its inside toward the corrugated element 2' as at 9.

Figure 21:
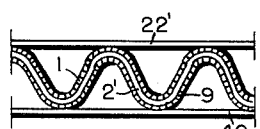
Figure 22:
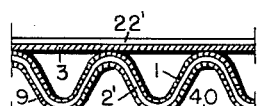
Figure 23:
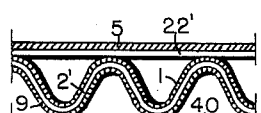

In FIG. 21, the corrugated element 2' has been treated on both sides as at 3 and at 9, and is bonded between liners 22' and 40'. In FIG. 22, as in FIG. 21, the corrugated element 2' has been treated on both sides as at 3 and at 9 and is bonded on one side to a liner 40' by the plain element 40 and on the other side to a liner 22' which has been treated on its side toward the corrugated element as at 1. In FIG. 23, as in FIG. 21, the corrugated element 2' has been treated on both sides as at 3 and at 9, and is bonded on one side to a liner 40', and on the other side to a liner 22' which has been treated on its outermost side as at 5.

Figure 24:
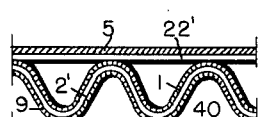
Figure 25:
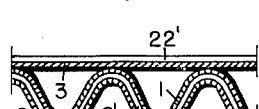
Figure 26:
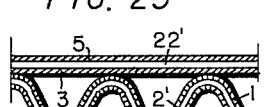

In FIG. 24 the corrugated element 2' has been treated on both sides as at 3 and at 9 and is bonded on both sides to liners 22' and 40', liner 22' being coated on its outermost side as at 5 while liner 40' is treated on its outermost side as at 13. In FIG. 25, as in FIG. 24, the corrugated element 2' has been treated on both sides at 3 and at 9 and is bonded on each side to a liner 22' and a liner 40', each of which has been treated on its innermost side, the liner 22' being treated as at 5 while the liner 40' on the opposite side has been treated as at 11. In FIG. 26, as is in the previous figures, the corrugated element 2' has been treated on both sides as at 1 and at 9. The outer liners bonded thereto, i.e., 22' and 40', have each been treated on both sides, liner 22' being treated on its outermost side as at 5 and on opposite side as at 3; liner 40' has been treated on the inner side as at 11 and on the opposite side as at 13.

In order that those skilled in the art may more completely understand the present invention and the preferred methods by which the same may be carried into effect, the following specific examples may be offered.

*Example 1*

More specifically to illustrate the practice of this invention using apparatus as shown in the drawings, the following experiment is conducted: a stiffening agent consisting of an aqueous sodium silicate (86.6 lbs. of sodium silicate [1] diluted with 13.4 lbs. of water) is applied to a wet 31 lb. corrugating medium (68" wide) by spraying through ¼ TT 95015 Spraying Systems Co. flat atomizing nozzles mounted beneath the lower corrugator roll. The nozzles are positioned about 7 to 9 inches from the roll to be sprayed and deliver 2.5 lbs./min./nozzle at 100 p.s.i.g. A good even coverage of the corrugated element is obtained at 125 ft./min. (20 lbs. dilute silicate/1000 ft.). The thus-sprayed corrugated element is bonded via the sprayed-on adhesive to a 42 lb. liner (68" wide) to form a single-faced corrugated board. About 7000 ft. of board are produced in this manner. No plugging of sprays is experienced even after stopping spraying for 20 minutes and then starting again. This single-faced board can be double backed in the conventional manner or have the exposed corrugated surface sprayed with silicate as shown in FIG. 1.

*Example 2*

To illustrate the improved strengths obtained by the practice of this invention, tests are conducted on 200 lb. test 15" x 10" x 10" corrugated boxes made from 42 lb. liners and a 31 lb. corrugated medium. Silicate is sprayed on the single-face side and a conventional starch bond is used on the double-back side. Top to bottom compression test results (average) are as follows:

| Deflection: | Average load (pounds) |
| --- | --- |
| 0 | 50 |
| ¼ | 322 |
| ½ | 710 |
| Max. yield | 764 |

*Example 3*

Using the procedure of Example 1, 11,000 linear feet of single-faced board, 50 inches wide (.009") with a 69 lb. liner, is prepared. Sodium silicates (37° Bé.>otherwise as in Example 1) is sprayed on with 6—¼ TT 950015 nozzles at 100 p.s.i.g. The edges of the liner are sprayed with the same silicate using ¼ TT 500067 nozzles at 80 p.s.i.g. The linear speed is 100 ft./min. A similar run also is made satisfactorily at 250 ft.²/min.

Silicate sprayed board shows an 80% bond retention in an eight hour test as compared to 50% retention for comparable conventional board.

In addition to the starch and silicate stiffening agents previously discussed herein, other materials also can be used. For examples, materials such as Piccopale resins, polyvinyl acetate, calcium polysulfide or other resins or glues can be used.

In those instances where a corrugated board embodying a planar liner coated or impregnated with a stiffening agent, e.g., an alkali metal silicate, is desired, the coating may be applied by spray or any other conventional paper coating technique. If desired, the apparatus of this invention can be employed by substituting a smooth-surfaced roll or rolls for the corrugated rolls.

While single-faced and double-backed board have been referred to hereinbefore, it will be understood that the practice of this invention also contemplates the production of triple wall board which, if desired, may embody any of the illustrative structures shown in FIGS. 12 to 26.

It is to be understood that although the invention has been described with specific reference to particular embodiments thereof, it is not to be so limited, since changes and alterations therein may be made which are within the full intended scope of this invention as defined by the appended claims.

What is claimed is:

1. In corrugated board-producing apparatus comprising cooperating corrugating rolls adapted to corrugate cellulosic media fed therebetween, and means for feeding to said rolls cellulosic media to be corrugated thereby, the improvement comprising, in combination,
  (a) means for directing a stream of wet steam against said cellulosic media prior to passage between said rolls,
  (b) an open-top container disposed immediately subjacent at least one of said rolls and extending parallel to the axis of the roll for substantially the entire length of said roll,
  (c) a plurality of spaced-apart nozzles disposed over said container and aligned to spray an aqueous liquid alkali metal silicate onto a corrugated cellulosic sheet traveling on said roll,
  (d) said nozzles being pivotally mounted to permit displacement from their position aligned to spray onto said corrugated sheet, to a position to permit dipping said nozzles into a body of liquid solvent for said silicate in said container.

2. The apparatus according to claim 1 wherein at least one of said corrugated rolls is provided with a plurality of spaced, circumferential grooves in which are disposed a plurality of stationary fingers adapted to maintain said corrugated media in contact with one of said rolls while said media is contacted with spray from said nozzle.

3. The apparatus according to claim 1 wherein the length of the roll to be covered by spray from the nozzles is defined by side shields and end shields spaced longitudinally along said rolls at predetermined distance, each shield embodying a spray nozzle aligned to spray in a direction substantially normal to the direction of the movement of said corrugated media.

4. Apparatus according to claim 3 wherein the end shields are aligned to spray an anti-adhesive in a direction substantially normal to the direction of movement of said corrugated media.

References Cited in the file of this patent

UNITED STATES PATENTS

| 1,199,508 | Swift | Sept. 26, 1916 |
| 1,770,757 | Maston | July 15, 1930 |
| 1,796,541 | Schoo | Mar. 17, 1931 |
| 2,287,411 | Boller et al. | June 23, 1942 |
| 2,723,707 | Erbe | Nov. 15, 1955 |
| 2,746,894 | Orser et al. | May 22, 1956 |
| 2,788,285 | Landers | Apr. 9, 1957 |

---

[1] 1Na₂O:3.3SiO₂, 37.3% solids (av.), specific gravity 40.0–41.2° Bé.